United States Patent [19]

Roe et al.

[11] Patent Number: 4,817,391

[45] Date of Patent: Apr. 4, 1989

[54] METHOD AND APPARATUS FOR PRODUCING A CONTROLLED ATMOSPHERE

[76] Inventors: Elman Roe, 12008 A S. 43rd Ave.; William R. Ash, 1409 W. Chestnut, both of Yakima, Wash. 98902; Terry Campbell, 5406 W. Washington; Steve Forney, 8313 Naches Heights Rd., both of Yakima, Wash. 98908

[21] Appl. No.: 115,108

[22] Filed: Nov. 2, 1987

[51] Int. Cl.⁴ .................................................. F25J 3/00
[52] U.S. Cl. ............................................. 62/17; 62/78; 62/94; 426/418; 426/419
[58] Field of Search ................... 62/17, 18, 78, 89, 91, 62/94; 426/418, 419

[56] References Cited

U.S. PATENT DOCUMENTS

| | | | |
|---|---|---|---|
| 1,819,643 | 4/1931 | Fleisher | 62/94 |
| 2,617,275 | 11/1952 | Goff et al. | 62/18 |
| 3,360,380 | 12/1967 | Bedrosian | 62/78 |
| 3,547,576 | 12/1970 | Sheikh | 62/78 |

Primary Examiner—Ronald C. Capossela
Attorney, Agent, or Firm—Don R. Mollick

[57] ABSTRACT

A method and apparatus for producing a controlled atmosphere in an area. The method includes the intermittent removal of oxygen, carbon dioxide water vapor and ethylene from the area. An apparatus to practice the method is disclosed that includes a compressor to increase the pressure of the gases present which are then separated by diffusion across membranes.

19 Claims, 2 Drawing Sheets

METHOD AND APPARATUS FOR PRODUCING A CONTROLLED ATMOSPHERE

FIELD OF INVENTION

This invention pertains to the production of controlled atmospheres particularly controlled atmospheres for the preservation of vegetable material and with still greater particularity to the production and maintenance of oxygen and carbon dioxide depleted atmospheres for the long term refrigerated storage of produce.

BACKGROUND OF INVENTION

It has been known for some time that produce stored under refrigeration maintains its freshness for a greater time than that stored at ambient temperatures. For example, the refrigerated shipment of produce from California to the East Coast has been done since the 1920's. It is not as widely known but is familiar to those in the business that controlling the atmosphere where storage is being undertaken extends the lifetime of the produce.

An important example is the storage of apples and other fruit in Washington State from one fall harvest to another. To provide proper storage the ripening process must be retarded. During the ripening process the starches in the fruit are converted to sugars through natural respiration processes. Ethylene gas is released and accelerates the process. With refrigeration alone the ripening process continues at a slower rate unless the temperature is reduced to a point where the fruit freezes resulting in considerable deterioration. To remedy this problem it has been found desirable to place the fruit into a dormant stage by placing it in a reduced oxygen atmosphere and a lowered temperature. Reduction of temperature is commonly done with large refrigeration units both in the prior art and the invention.

There are several methods in present use for production of the proper atmosphere. The simplest method is flooding the area with nitrogen separated by liquidation of air. The nitrogen is supplied either in compressed or liquid form. While this method has the advantage of simplicity it is quite expensive to maintain the proper atmosphere and thus not met with widespread adoption. The method in most common use in the Washington State apple business is to burn out the oxygen and remove combustion products. To accomplish this end propane is injected into an incoming air stream and ignited, generally by a catalytic burner. The resulting products of combustion are nitrogen, water vapor and carbon dioxide. The carbon dioxide is harmful to the produce and must be removed. The removal of carbon dioxide is commonly done by devices called scrubbers. One type of scrubber uses sodium or potassium hydroxide solutions to absorb the carbon dioxide forming sodium or potassium carbonate as a waste product. Similarly, calcium hydroxide (lime) has been used to remove the carbon dioxide. These chemical scrubbers are expensive to maintain and require constant addition of reagents with removal and storage of wastes. Problems with scrubbers have led to large scale introduction of molecular seives as removal means. A molecular seive will absorb a gas such as carbon dioxide at one temperature then release the carbon dioxide at an elevated temperature. In operation the seive is cycled between absorption and regeneration states requiring heating and cooling at each step.

The primary problems with the use of catalytic burners and molecular seives are related to cost of operation. These are largely related to the rising cost of energy. Since the atmosphere is reused the input of atmosphere to the catalytic burner is on the order of 0° C. This atmosphere must be heated to the ignition point of the propane mixture even in a catalytic burner. The cost of the energy to do so is not unsubstantial. In addition the molecular seive must be heated on its regeneration cycle further increasing energy consumption. There must be an excess of oxygen to ensure formation of carbon dioxide in the burner rather than carbon monoxide. This requirement puts an upper limit on the possible oxygen reduction in this type of system. Finally, this type of a system does not remove ethylene gas formed from the fruit which accelerates ripening.

Accordingly, there is a demand for an atmosphere control system which (1) operates at a lower temperature than existing systems, (2) controls oxygen content to less than 2.5% to reduce the conversion of starch to sugar, (3) removes almost all carbon dioxide from the atmosphere and (4) removes ethylene gas from the atmosphere.

SUMMARY OF THE INVENTION

The invention provides a relatively simple system for control of atmosphere which operates at cold storage temperatures. The system can remove almost all of the oxygen from the atmosphere. No carbon dioxide is generated by the system itself and in fact carbon dioxide generated by ripening produce is removed from the atmosphere by the system. Finally, the system also removes ethylene gas from the atmosphere.

The system includes an area in which the control atmosphere is desired. This area is also equipped with refrigeration equipment. The atmosphere from this area passes through a compressor which raises the pressure to a point where the system can operate. The compressed atmosphere then passes through a gas separator which includes a plurality of hollow tubes of semi permiable membranes which separate nitrogen from ethylene, carbon dioxide and oxygen. The nitrogen then flows back to the control atmosphere area. A controlling system allows control of the pressures and gas content throughout the system.

DETAILED DESCRIPTION OF THE INVENTION

Figure 1:
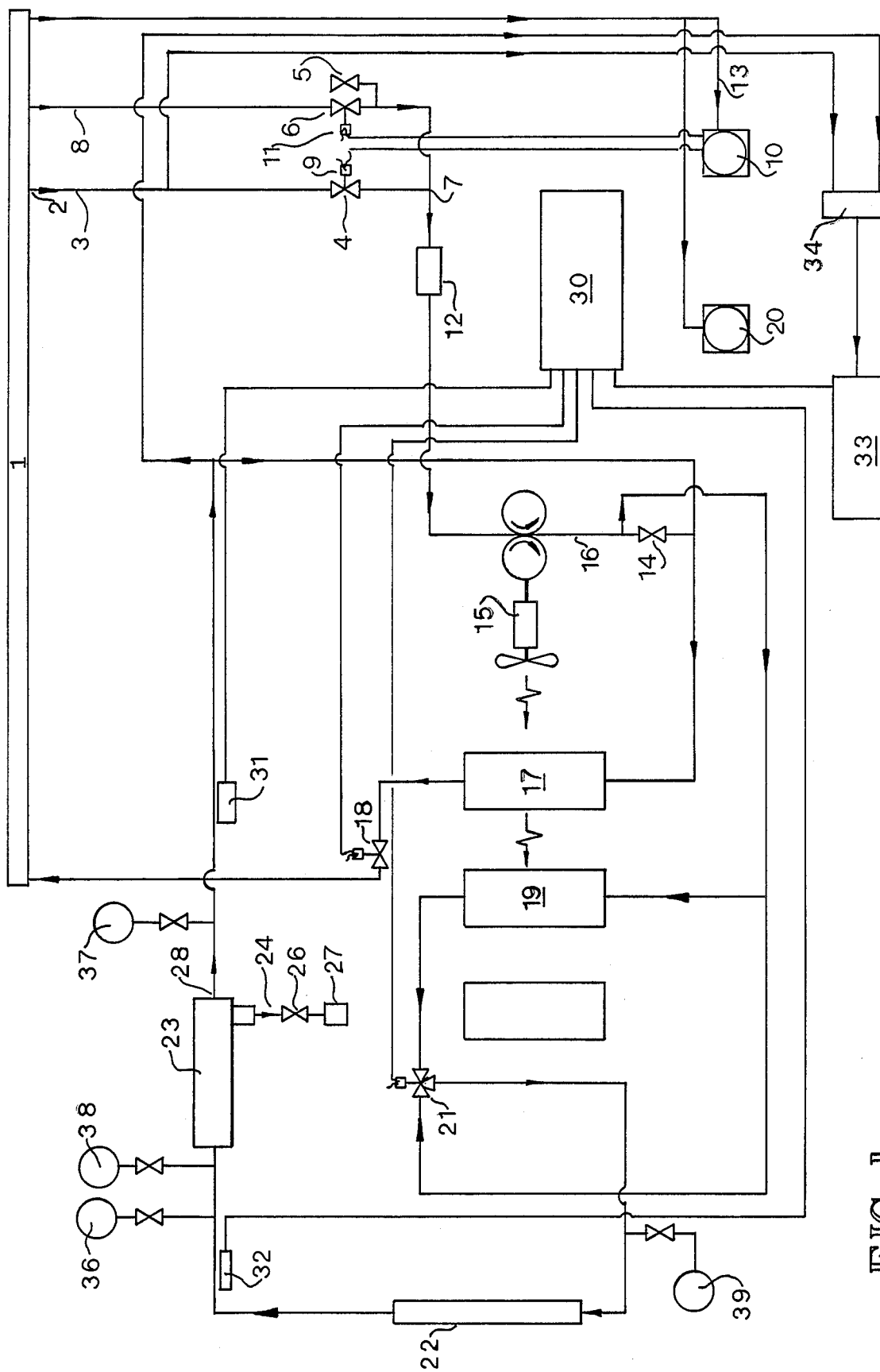
FIG. 1 is a schematic piping diagram of the invention.

FIG. 1 is a schematic drawing of the system. The storage area 1 is indicated by a square. In actual use area 1 could be a warehouse or room that is so constructed as to be airtight. The storage area has its walls treated so that no movement of atmosphere from outside controlled area can enter. The walls are sealed to floor which is also vapor tight. All wall penetrations are also vapor tight. The doors are sealed to the walls. Storage area 1 is equipped with bubble valves (not shown) to prevent the pressure from being 0.75 inches of water greater of less than ambient atmospheric pressure. The exit 2 of storage area 1 is connected to an outlet line 3. Outlet line 3 is connected to an electrically operated valve 4. A second electrically operated air valve 6 is connected 7 downstream of valve 4. Valve 6 is also connected to the outside atmosphere 8. An intake bleeder adjustment valve 5 is connected in parallel to valve 6 to provide a constant flow of atmosphere. Valves 4 and 6 operate to control pressure in area 1 and indirectly control gas content. The solenoids 9, 11 of valves 4, 6 are connected to a pressure sensing device 10 which senses the pressure in area 1 via a conduit 13. Pressure sensor 10 may be a photohelic device. A common setting for pressure sensor 10 is for 1 inch of water column of positive pressure to open solenoid 9 and close solenoid 11 of valve 6 and for 1 inch of negative pressure to close solenoid 9 of valve 4 and open solenoid 11 of valve 6. This controls the gas pressure in storage area 1. The result is that when the pressure is too low in area 1 air is drawn through inlet 8 and valve 6 into the system. A second pressure sensor 20 is connected to shut down the system if pressure is excessive. Air cleaner 12 is provided to remove particulate material from the airstream. From point 7 the piping enters the high pressure compressor package 15. Package 15 increases gas pressure to as much as 300 pounds per square inch although the system will operate with a pressure as low as 20 pounds per square inch. A typical size of compressor is from 10 to 80 horse power with a 40 horse power unit used in the preferred embodiment. A suitable compressor unit is sold as a Sullar Series 10B 40hp unit by Central AG & Manufacturing. Compressor unit 15 includes an air cleaner 12 to eliminate oil and/or other contaminants from the gas stream. An $O_2$ bleeder adjustment valve 14 is connected to output 16 of compressor 15. The outlet of valve 14 enters an air cooler 17. The outlet of air cooler 17 exits to the storage space 1 via a motor operated valve 18. A second air cooler inlet 19 is also connected to the output of compressor 15. The output of air cooler 19 and the output of compressor 15 are further connected to a three way valve 21. The output of valve 21 is connected to a coalesing filter and trap 22 provided to remove oil and particulate matter from the compressor from the gas stream. The output of filter 22 enters the gas separator unit 23. Gas separator unit 23 is a commercially available gas separator unit which includes an assembly of semi permeable cylindrical membranes in a metallic shell. Such units are commonly used in petro chemical processing. The particular unit used was manufactured by Montesano Company of St. Louis, Mo. and was sold under the trademark "Prism". Other similar gas separator units could be substituted by a person of average skill in the art. The gas separator unit 23 has two outputs. The first output 24 is called the permiate or fast gas output. Output 24 is connected to a valve 26 and allows exit of carbon dioxide ($CO_2$), water vapor ($H_2O$), oxygen ($O_2$) and ethylene gases which are then vented to the outside atmosphere. A moisture separator and trap 27 removes the moisture from this waste gas between venting. The second output 28 is the non-permiate or slow gas output. Output 28 is connected to the input of air cooler 17. The primary constituent of output 28 is clean dry nitrogen ($N_2$).

The invention further includes an electronic control system. The primary component of the control system is a programable controller 31. Programable controller 30 can be a programable personal computer such as a PC/XT as that manufactured by International Business Machines or equivalent. Controller 30 also includes necessary instructions or software for operation of the system. Controller 30 is connected to suitable sensors to sense the status of the system. A pressure transducer 31 is connected to the output of the gas separator 28 to sense the pressure of the gas leaving separator 28. A temperature probe 32 is connected between filter 22 and gas separator 23 to sense the temperature of the gas stream at this point. An oxygen/carbon dioxide sensor 33 is connected to a selection valve 34 to sense the relative percentages of carbon dioxide and oxygen in storage area 1 and the output of gas separator 28. Inputs 31, 32 and 33 are all connected through suitable interfaces to the programable controller 30. Programable controller 30 processes the information provided by sensors 31, 32 and 33 and controls the operation of three-way valve 21 and motor operated valve 18. In this manner the content of the atmosphere in storage area 1 is monitored and controlled.

The system is provided with pressure gauges 36 and 37 which monitor the input and output pressures of the gas separator 28. A temperature indicator 38 tells the operator what the temperature of the gas stream at the input of gas separator 28 is. A second pressure indicator gives an indication of the pressure at the output of valve 21.

The result is that storage area 1 is constantly flooded with a gas that is largely nitrogen but includes controlled amounts of oxygen and water vapor. Oxygen, ethylene, and carbon dioxide either separated by the ripening process or from leaks are constantly removed by the system.

The gas mixtures obtainable with this apparatus are unobtainable with any other commercially available apparatus. The apparatus reduces oxygen content below 2% of the mixture. Tests conducted on the system show the most beneficial range to be between 1.5 and 2.5% with the best preservation at the low end of the range. Conventional equipment provides an oxygen range of just below 5%. Apples stored in a 1.5% oxygen environment retain 83% of initial firmness after the storage season compared with 73% with conventional burner equipment. Tests done at Michigan State University are even more impressive with storage at 1.55 oxygen and 1.85 carbon dioxide at 38 degrees for 173 days averaging 92% retention of firmness. The claimed apparatus also eliminates carbon dioxide which in excessive amounts kills the produce allowing spoilage. Finally the apparatus lowers ethylene concentration to between 10 parts per billion and 50 parts per million on a continuing basis. This is useful because conventional apparatus generates ethylene as part of the combustion process. It is well known that ethylene causes premature ripening in stored fruit and produce. Similarly, lift trucks cannot be used in controlled atmosphere storage because of the ethylene generated during combustion.

Figure 2:
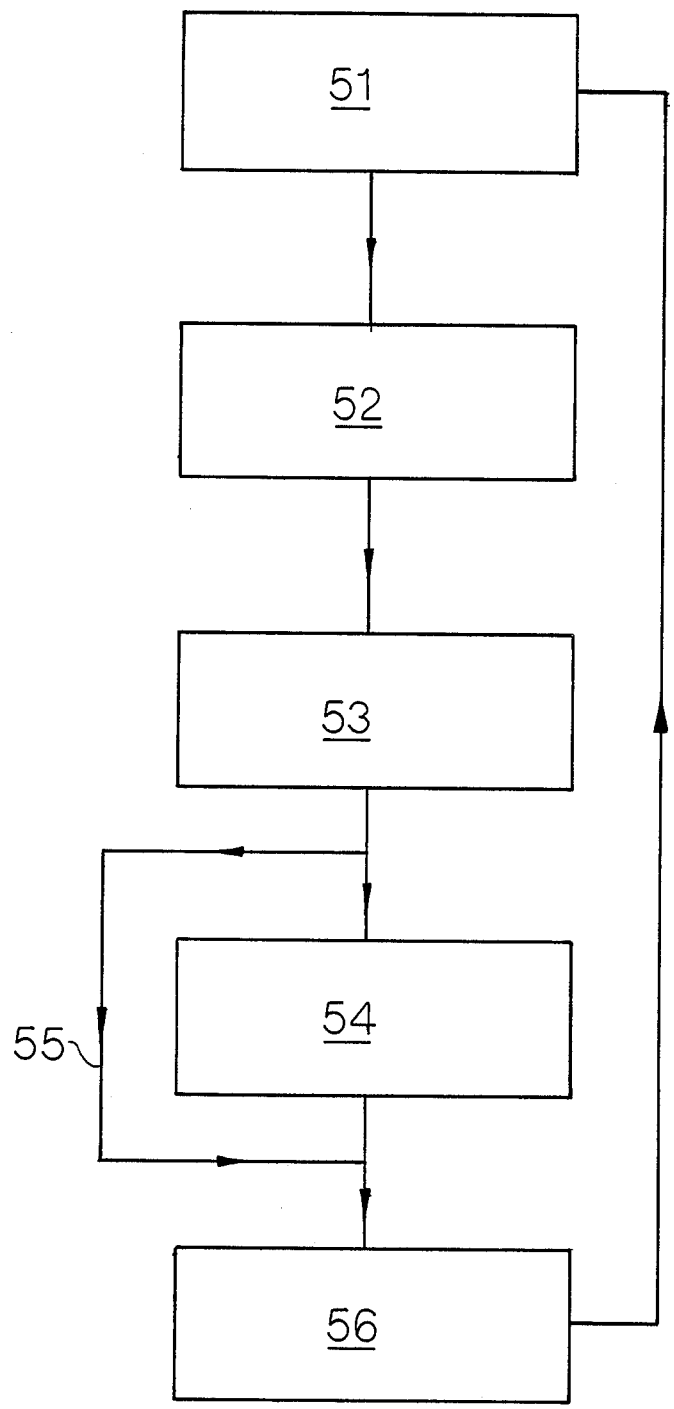
FIG. 2 is a flow chart of the invention.

FIG. 2 is a flow chart of the method of the invention. As stated above first 51 the gases are removed from the area where the controlled atmosphere is desired. The gases are then compressed 52 into an elevated pressure for efficient operation. The nitrogen is then separated from the oxygen, carbon dioxide, water vapor and ethylene by diffusion 53. In some cases it is desirable to hydrate 54 the nitrogen separated for storage of some produce. In other cases this step may be bypassed 55. Finally, the nitrogen is reintroduced 56 to the storage area.

The above embodiment is illustrative only the invention being defined solely by the subjoined claims.

We claim:

1. An apparatus for producing a controlled atmosphere in a preselected area; comprising,
    an inlet for accepting exhaust gases from said area where the controlled atmosphere is desired; and, a compressor having an entrance and an exit with said entrance connected to said inlet for increasing the pressure of the gases received from said inlet; and, gas separation means connected to the exit of said compressor for removing gases selected from the group of carbon dioxide, oxygen, ethylene, water vapor from the gases received from said compressor; and, an outlet connected to said gas separation means for releasing gases into said area where the controlled atmosphere is desired.

2. An apparatus for producing a controlled atmosphere in a preselected area, as in claim 1; further comprising, hydration means connected between said gas separation means and said outlet for increasing the relative humidity in said area where the controlled atmosphere is desired; and means for connecting said hydration means to said gas separation means.

3. An apparatus for producing a controlled atmosphere in a preselected area, as in claim 2, wherein said gas separation means is a series of semi-permeate tubes in a pressure jacket.

4. An apparatus for producing a controlled atmosphere as in claim 3, wherein said semi-permeate tubs are so constructed that the selected gases diffuse through the tubes faster than nitrogen.

5. An apparatus for producing a controlled atmosphere as in claim 3, wherein said apparatus is co constructed as to avoid the introduction of contaminants into the gas stream.

6. An apparatus for producing a controlled atmosphere in a preselected area, as in claim 1, further comprising;

pressure controlling means connected to said area where the controlled atmosphere is desired for preventing the pressure in said area from going outside a preselected zone of pressure.

7. An apparatus for producing a controlled atmosphere as in claim 6, wherein said area is adapted for the storage of produce.

8. An apparatus for producing a controlled atmosphere as in claim 7, wherein said area is adapted for the storage of fruit.

9. An apparatus for producing a controlled atmosphere as in claim 8, wherein said area is adapted for the storage of apples.

10. An apparatus for producing a controlled atmosphere as in claim 8 wherein the gases removed are ethylene and oxygen.

11. An apparatus for producing a controlled atmosphere in a preselected area, as in claim 1, further comprising;

a first valve connected between said compressor and said inlet; and, a second valve connected between the entrance of said compressor and the outside atmosphere; and, sensing means connected to said area where the controlled atmosphere is desired for sensing the pressure in said area; and, activation means connected to said first valve and said second valve and said sensing means for activating said first valve and said second valve when said sensing means senses a pressure outside of predetermined limits.

12. An apparatus for producing a controlled atmosphere in a preselected area, as in claim 11, further comprising an air filter connected to said second valve.

13. An apparatus for producing a controlled atmosphere in a preselected area, as in claim 1, further comprising;

a bypass valve connected around said gas, separation means for controlling the amount of oxygen in said area where a controlled atmosphere is desired; and, means for adjusting said bypass valve.

14. An apparatus for producing a controlled atmosphere in a preselected area, as in claim 13, further comprising;

an oil separator connected between said compressor and said gas separation means for removing oil from the gas issuing from said compressor; and, a gas filter connected between said oil separator and said gas separation means for removing particulate matter from the gas issuing from said compressor.

15. An apparatus for producing a controlled atmosphere in a preselected area, as in claim 13, further comprising;

a second outlet from said gas separation means for allowing waste gases to exit said gas separation means; and, a moisture separator connected to said second outlet for removing water.

16. A method for producing a controlled atmosphere in an area comprising the steps of;

removing the gases from the area on an intermittent basis; and, compressing the gases removed; and, separating the nitrogen from the oxygen, carbon dioxide, water vapor and ethylene in the gas mixture, by diffusion; and, reintroducing said nitrogen into the area.

17. A method as in claim 16, further comprising the step of hydrating the nitrogen reintroduced to said area.

18. A method as in claim 16, wherein said separating step is accomplished by allowing the oxygen, carbon dioxide, water vapor and ethylene to diffuse through a membrane into an area of low relative pressure while retaining nitrogen.

19. A method as in claim 18, wherein said membrane is composed of a plurality of semi-permeate tubes in a pressure shell.

* * * * *